United States Patent Office 3,242,102
Patented Mar. 22, 1966

3,242,102
METAL CHELATE POLYMERS
Arnold Schmeckenbecher, Elkins Park, Pa., assignor to Sperry Rand Corporation, New York, N.Y., a corporation of Delaware
No Drawing. Filed June 30, 1960, Ser. No. 39,830
16 Claims. (Cl. 260—2)

This invention relates to polymerized metal acetylacetonates and their homologs, and methods of producing metal and metal oxide films therefrom.

The problem of producing metal and metal oxide films, and particularly thin films of a predetermined pattern which are ferromagnetic, is one which has not been solved in a completely satisfactory manner. Films which are produced by vacuum deposition or other methods which produce a film from metals or metal compounds in the vapor phase are difficult to prepare in the proper physical form. For example, the films must not have improper crystal form or their magnetic properties in memory storage and logic circuits are not always of the best. Also it has been extremely difficult, and in many cases impossible in the past to produce coatings in intricate patterns or completely coating the surfaces of irregular shape such as cavities.

The present invention solves most of these problems by a new class of metal compounds which can be formed into coating compositions which when applied to suitable substrates can be decomposed by heat to form metal or metal oxide coatings which are very thin and have desirable physical properties. Such coating compositions can be applied in any desired pattern and will coat surfaces of unusual and hitherto uncoatable shapes such as cavities, configurations with reentrant angles and the like.

Reference has been made above to the decomposition of the new polymers of the present invention to form metal or metal oxide films. The same polymer can be used to produce either metal or oxide coatings depending on the conditions of the decomposition, that is to say whether it is in the presence of a reducing or oxidizing atmosphere.

Essentially the new compounds of the present invention belong to the class of bidentate metal chelates, particularly of metals such as iron, nickel and cobalt, but also including other metals such as manganese, magnesium, chromium, copper, zinc, platinum and the like. As with all chelates the metal combines with both electrovalences and coordinate valence bonds and the structural formula will differ somewhat depending on the nature of the element. For simplicity's sake the compounds of nickel will be discussed, as this metal has a total of four bonds, two electrovalent and two coordinate.

Simple nickel acetylacetonate has the following formula:

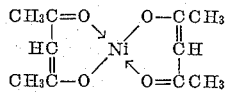

The simple compound when precipitated from solution by evaporation is crystalline and it has a fairly high vapor pressure, for example it can be evaporated in a high vacuum at temperatures below 200° C. The simple metal acetylacetonates are known compounds and they are useless for the purposes for which the compounds of the present invention are intended. When they are applied to a substrate and heated they evaporate in part and no satisfactory film is produced.

When the simple metal acetylacetonates or their homologs are dissolved in solvents which include oxygen or nitrogen having an unshared electron pair, and maintained at a temperature above 50° C. and preferably from 70 to 100° C. polymerization takes place, and after the reaction is substantially complete evaporation of the solvent produces a non-crystalline product which has no sharp melting point and which has a glossy appearance. These compounds have a negligible vapor pressure and on heating decompose to form films of very desirable magnetic properties. These compounds are not the same as the simple crystalline compounds, and show a characteristic X-ray diffraction spectrum which is entirely different from the simple crystalline compounds and has diffuse rather than sharp lines.

The present invention relates to a practical process and products thereof. This means that reasonable reaction times are needed and in the case of some polymers the reaction does not proceed a hundred percent. In other words, there may be a minor amount of crystalline material. When used for film formation some of this may be lost by volatilization but the loss is not serious and the products are therefore useful even though not pure polymer. Such compounds will be referred to as "partly glassy."

It has not been possible hitherto to determine the exact molecular weights of the polymers of the present invention and it is almost certain that they constitute mixtures. It appears probable that the structure of such polymers may be represented for purposes of illustration as follows:

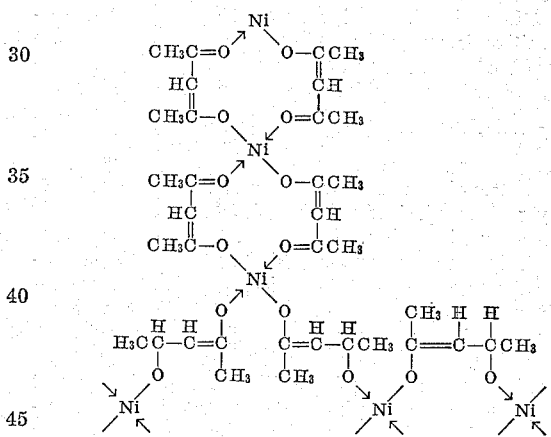

The above formula shows both continuous chains and branched chains. It cannot be determined exactly where the different linkages occur and it seems to be true that the compounds are not a single well defined compound. This is in general true of most high molecular polymers. That the compounds are polymers and not normal solvates is demonstrated by the fact that on chemical analysis the proportion of nickel is the same as in the simple unpolymerized compound and that the vapor pressure of the polymer is much lower than that of the crystalline material.

With other metals which have different numbers of valence bonds the structure is of course somewhat different, for example in the case of iron there are three electrovalent bonds and it seems probable that the iron polymers may have a wider degree of branched chain linkage.

The ease with which the polymers are prepared varies from metal to metal. With the solvents used in the present invention nickel acetylacetonate and its homologs polymerize quite readily at moderate temperatures. The corresponding ferric compounds require higher temperatures and somewhat longer heating.

Among typical solvents having unshared electron pairs are such solvents as dioxane, tetrahydrofurane, acetylacetone and various amines such as trimethylamine. Peculiarly enough there is one other solvent which although it belongs to a different class is also effective, that is carbon tetrachloride. Chlorine, it is true, possesses a number of electron pairs not all of which are shared. However, it is not sufficient that there be a single unshared electron pair associated with chlorine because other closely related compounds such as chloroform are not effective to produce the polymers of the present invention. Shared electron pairs associated with chlorine evidently have different properties than is the case with corresponding electron pairs in compounds having oxygen or nitrogen. The reason why only carbon tetrachloride is effective is not known.

While there has been no rigorous proof we believe that the mechanism, at least of the other solvents, probably proceeds by the temporary opening up of oxygen metal bonds in the simple chelate as a result of the influence of the unshared electron pair. When the bond closes again it is apparently not with the same metal atom, and this results in the production of a polymer. Even though the above explanation seems highly probable it is not possible with presently available means to prove it, and therefore it is advanced as a probable explanation and the invention is not limited to it.

While homologs of the polymer are included there is some limit on the size of the organic side chains and in general therefore the methyl groups of the acetylacetonate radical can be substituted effectively only with other lower alkyl radicals.

The important characteristics of the polymers of the present invention in making useful films on thermal decomposition is also enhanced by the fact that the polymers of the present invention are soluble in a large number of solvents and coating compositions of a wide range of physical characteristics thus become possible so that the application of the polymer to the surface of the desired substrate may be effected by practically any of the standard techniques of the printing art. This constitutes a very real practical advantage in the use of compounds of the present invention. The nature of the solvent is not particularly critical as opposed to the very definite limitation of the classes of solvents which will effect the polymerization. Thus it is possible to use solutions or other dispersions of the polymers in the solvents in which they were formed. On the other hand, these solvents may be removed at temperatures below the decomposition point of the polymers and they may be redissolved in other solvents. For most purposes, however, the solvents in which the polymers are formed are quite suitable and there is, of course, a saving by eliminating the need for resolution.

The invention will be described in greater detail in conjunction with the following specific examples in which the parts are by weight unless otherwise specified.

*Example 1*

276 parts of vacuum sublimed nickel acetylacetonate and 100 parts of similarly sublimed ferric acetylacetonate were dissolved in 5000 parts of dioxane. The solution was heated to 70° C. and maintained at this temperature for a short time until polymerization was fairly complete. The solution was then sprayed onto quartz and onto copper slides which were kept at 70° C. until the solvent had evaporated. A hard glassy coat of the polymer formed which did not show evidence of definite crystal structure.

The coated slides were then charged into a furnace and heated slowly to 600° C. in a stream of hydrogen. The polymer film began to decompose and was maintained at the same temperature until decomposition was substantially complete. A nickel-iron film having about 80% nickel resulted. This film had excellent magnetic properties.

*Example 2*

The solution of the ferric-nickel acetylacetonate was prepared as in the preceding example, but instead of spraying onto smooth slides it was sprayed onto porous slides having cavities. Evaporation of the solvent and firing to decompose the polymer proceeded as described in Example 1. The film produced was uniform and fully coated the irregular surface of the porous cavity-filled substrate.

*Example 3*

The procedure of Example 1 was repeated, replacing the dioxane with an equal amount of tetrahydrofurane and the heating from 70° C. to 80° C. was maintained until polymerization was substantially complete. On coating a substrate and removing the solvent as described in Example 1 a hard glassy film of the polymer resulted which was identical with that produced using dioxane as a polymerizing solvent. When decomposed by firing the film showed the same properties as in the case of Example 1.

*Example 4*

The procedure of Example 1 was repeated, replacing the dioxane with an equal amount of trimethylamine and the heating from 70° C. to 80° C. was maintained until polymerization was substantially complete. On coating a substrate and removing the solvent as described in Example 1 a hard glassy film of the polymer resulted which was identical with that produced using dioxane as a polymerizing solvent. When decomposed by firing the film showed the same properties as in the case of Example 1.

*Example 5*

The procedure of Example 1 was repeated, replacing the nickel and ferric acetylacetonates with a stoichiometrical of equivalent platinum acetylacetonate. A hard partly glassy film was produced and on firing it was transformed into a uniform film of platinum with no signs of breaks or formation of amorphous platinum black.

*Example 6*

The procedure of Example 1 was followed, using an amount of nickel acetylacetonate corresponding to the weight of the mixed ferric and nickel acetylacetonates. The solution was first prepared in benzene and a second sample of the nickel acetylacetonate was dissolved in acetylacetone. The benzene solution was heated to the boiling point of benzene and held at this temperature for approximately twenty-four hours. On evaporation of the benzene crystalline simple nickel acetylacetonate was recovered. The second solution in acetylacetone was heated to between 50 and 55° C. for about eight hours. On evaporation of the solvent the typical hard glassy polymer of nickel acetylacetonate was recovered. In spite of the lower temperature polymerization was substantially complete.

This example shows that even at higher temperatures a solvent such as benzene which does not have unshared electron pairs associated with an oxygen or nitrogen atom will not produce a glassy polymer.

*Example 7*

The procedure of Example 1 was followed except that as in Example 6 the mixture of nickel and iron acetylacetonates were replaced with corresponding amounts of ferric acetylacetonate, cobaltic acetylacetonate, magnesium acetylacetonate and zinc acetylacetonate. In the case of cobaltic polymer it was entirely glassy, whereas the ferric, magnesium and zinc polymers were partly glassy but were useful compounds.

*Example 8*

The procedure of Example 7 was repeated, substituting acetylacetone for the dioxane. In this example pure nickel acetylacetonate was also used as one of the materials but magnesium acetylacetonate was not. As before the nickel polymer was completely glassy, as was the cobaltic polymer. The ferric and zinc compounds behaved as in the preceding example, that is to say partly glassy products were obtained.

*Example 9*

The procedure of Example 8 was repeated using tetrahydrofurane instead of acetylacetone but only nickel and zinc acetylacetonates were employed. The result of the nickel acetylacetonate was a partly glossy polymer, as was the zinc. In other words, the tetrahydrofurane was not quite as good a polymerizing solvent for nickel acetylacetonate but gave exactly the same results with zinc acetylacetonate.

*Example 10*

The procedure of Example 8 was repeated using carbon tetrachloride in an equivalent amount in place of the acetylacetone and applying sufficient pressure so that the solvent could not boil at reaction temperature. In this example the acetylacetonates used were nickel and chromic acetylacetonates. In both cases a partly glassy product was obtained.

Examples 7 to 10 show that different solvents have somewhat different polymerizing powers and that the polymerization of different acetylacetonates is not identical in all solvents. This is in general true of the present invention and the examples show that in general dioxane and acetylacetone have slightly greater polymerizing powers than do the other two solvents.

*Example 11*

351 parts of nickel butyryl-ethylacetonate and 100 parts of ferric acetylacetonate were dissolved in 5000 parts of dioxane and the procedure of Example 1 carried out. A partly glassy to glassy polymer resulted and on decomposition gave a good nickel iron film.

*Example 12*

269 parts of vacuum sublimed ferric acetylacetonates, 134 parts of manganic acetylacetonate, 11 parts of zinc acetylacetonate, and 9.3 parts of magnesium acetylacetonate were dissolved in 10,000 parts of dioxane. The solution was filtered and then heated to 80° C. until polymerization was substantially complete. A series of coatings were made on platinum foil evaporating off the solvent between each coating until a continuous coat of glassy material had been formed. The platinum foil was then heated in air to 1000° C. and maintained at this temperature for about an hour. Thereupon it was rapidly cooled to room temperature and a film of ferromagnetic material was present which had a coercive force of 2.9 oersteds and a ratio of residual induction to maximum induction of .45.

I claim:

1. A process of polymerizing a polymerizable acylacetonate of at least one metal selected from the group consisting of nickel, iron, cobalt, platinum, zinc, magnesium and chromium which comprises heating the metal acylacetonate in solution in a solvent selected from the group consisting of dioxane, tetrahydrofurane, acetylacetone, trimethylamine and carbon tetrachloride until the metal acylacetonate is polymerized.

2. A process according to claim 1 in which the solvent is trimethylamine.

3. A process according to claim 1 in which the solvent is carbon tetrachloride.

4. Polymerized acylacetonates of at least one metal selected from the group consisting of nickel, iron, cobalt, platinum, zinc, magnesium and chromium, said acylacetonates being connected to the metal atoms by alternate electrovalent and covalent bonds to form chelates, the alkyl group comprising a lower alkyl radical, when prepared by the process of claim 1, said polymers having at least a partially glassy appearance and, therefore, predominately non-crystalline and having an X-ray diffraction pattern of diffuse lines as opposed to the sharp lines of the corresponding predominately crystalline simple acylacetonates, said polymers having a very low vapor pressure and decomposing below their sublimation temperatures.

5. A polymer according to claim 4 in which the polymer comprises polymerized nickel acetylacetonate.

6. A polymer according to claim 4 in which the polymer comprises polymerized ferric acetylacetonate.

7. A polymer according to claim 4 in which the polymer comprises polymerized cobaltic acetylacetonate.

8. A polymer according to claim 4 in which the polymer comprises polymerized zinc acetylacetonate.

9. A polymer according to claim 4 in which the polymer comprises polymerized magnesium acetylacetonate.

10. A polymer according to claim 4 in which the polymer comprises polymerized chromic acetylacetonate.

11. A process according to claim 1 in which the solvent is dioxane.

12. A process according to claim 1 in which the solvent is acetylacetone.

13. A process according to claim 1 in which the solvent is tetrahydrofurane.

14. A process according to claim 1 in which the acylacetonate is acetylacetonate.

15. A process according to claim 2 in which the acylacetonate is acetylacetonate.

16. A process according to claim 3 in which the acylacetonate is acetylacetonate.

References Cited by the Examiner

UNITED STATES PATENTS

| | | | |
|---|---|---|---|
| 2,659,711 | 11/1953 | Wilkins et al. | 260—2 |
| 2,933,474 | 4/1960 | Handy et al. | 260—62 |

OTHER REFERENCES

Van Uitert et al.: Journal of American Chemical Society, vol. 75, pages 457–460, Jan. 20, 1953.

Martin: Journal of American Chemical Society, vol. 80, 233–6, Jan. 5, 1958.

Knobloch: Dissertation Abstracts, vol. 20, page 1171 (1959).

Berlin et al.: Chemical Abstracts, vol. 54, page 10854, June 10, 1960.

JOSEPH L. SCHOFER, *Primary Examiner.*

MILTON STERMAN, HAROLD N. BURSTEIN,
*Examiners.*